United States Patent [19]

Iosue et al.

[11] 3,708,609

[45] Jan. 2, 1973

[54] LAMINATED BUS BAR ASSEMBLY

[75] Inventors: Michael F. Iosue; Andre A. Lernould, both of Danielson, Conn.

[73] Assignee: Rogers Corporation, Rogers, Conn.

[22] Filed: Aug. 17, 1971

[21] Appl. No.: 172,415

[52] U.S. Cl. ....................174/72 B, 29/193, 29/624, 174/117 FF

[51] Int. Cl. .......H02g 5/00, H01b 7/08, H01b 13/00

[58] Field of Search ............174/71 B, 72 B, 117 FF; 317/261

[56] References Cited

UNITED STATES PATENTS

| | | | |
|---|---|---|---|
| 3,264,403 | 8/1966 | Erdle | 174/72 B |
| 3,448,355 | 6/1969 | Ahearn, Jr. et al | 174/72 B X |

FOREIGN PATENTS OR APPLICATIONS

| | | | |
|---|---|---|---|
| 1,464,631 | 11/1966 | France | 317/261 |
| 1,471,078 | 1/1967 | France | 174/72 B |
| 367,147 | 2/1932 | Great Britain | 317/261 |
| 6,414,024 | 8/1965 | Netherlands | 174/117 FF |

*Primary Examiner*—Laramie E. Askin
*Attorney*—David S. Fishman et al.

[57] ABSTRACT

A multilayer conductor intermediate of "ladder" construction wherein conductor subassemblies which are to be employed as bus bars define transverse members interconnecting parallel supporting members. The conductor subassemblies may be severed from the supporting members and/or subdivided by making cuts in regions where the individual conductors of the multilayer structure are of reduced width and both vertically and laterally displaced.

14 Claims, 6 Drawing Figures

Inventors
Michael F. Iosue
Andre A. Lernould

By FISHMAN & VANKIRK
Attorneys

Inventors
Michael F. Iosue
Andre A. Lernould
By FISHMAN & VAN KIRK
Attorneys

Inventors
Michael F. Iosue
Andre A. Lernould

By FISHMAN & VANKIRK
Attorneys

LAMINATED BUS BAR ASSEMBLY

BACKGROUND OF THE INVENTION

1. Field of the Invention

The present invention relates to the manufacture of electrical conductor assemblies. More specifically, this invention is directed to multiplayer electrical conductor assemblies of the printed circuit type which are particularly well suited for employment as bus bars. Accordingly, the general objects of the invention are to provide novel and improved methods and apparatus of such character.

2. Description of the Prior Art

While not limited thereto in its utility, the present invention is particularly well suited for use as and in the manufacture of bus bars of the printed circuit type. Numerous multilayer printed circuits and printed circuit bus bar assemblies characterized by the requisite electrical properties are presently available. The typical printed circuit bus bar will comprise a pair of elongated conductors formed from copper foil. A plurality of tabs will extend transversely to the main dimension of each conductor so as to facilitate electrical connection to electrical circuit components. The conductors will be separated by a layer of insulation material and the conductor-insulation laminate will be sandwiched between a pair of outer or protective layers of insulation material. The resulting product is thus typically a five-layer laminate which includes two elongated, parallel conductors. Bus bar assemblies of the type with which the present invention is concerned may, of course have one or more than two conductors.

A number of problems have been encountered in the manufacture and use of bus bar assemblies of the above briefly described type. Conductors for the bus bars are of relatively small size. The handling of these small conductors, particularly during plating and assembly operations, is quite difficult and consequently very costly. A further characteristic of the prior art bus bar assembly is that a separate production line must be established to meet each customer requirement. Restated, in the prior art it is not possible to produce a standard multilayer bus bar assembly and to thereafter cut the standard assembly into lengths as desired by the user for its particular operation. The thickness of the insulation separating the conductors of a multilayer bus bar will typically be in the range of 0.002 inches in the interest of achieving the requisite electrical properties and attempts to sever prior art multilayer conductor assemblies intermediate their ends have resulted in the creation of short circuits between conductors previously separated by the thin intermediate layer of insulation.

The ultimate users of prior art multilayer conductor assemblies of the type which may be employed in power distribution systems have also objected to the inability to readily remove those transversely extending tabs which were not employed to connect the bus bar to the associated circuitry. The tabs will not be covered with insulation and, since the danger of short circuiting layer to layer is not a problem, unused tabs may be mechanically severed. However, due to the usual close spacing of the tabs, positioning of the tooling necessary for clean severing of unused tabs is a difficult and time-consuming operation.

SUMMARY OF THE INVENTION

The present invention overcomes the above briefly discussed and other disadvantages of the prior art by providing a novel and improved multilayer conductor assembly and a method of manufacture thereof. In accordance with the invention, a plurality of conductors are produced in such a manner that all may be handled as a unitized conductor intermediate. The conductor intermediates will comprise "ladder" constructions wherein lengths of conductive material which are to be employed as bus bar conductors define closely spaced "rungs" held together by "side rails." Adjacent the junction of the rungs and the side rails the width of each of the conductors will be reduced in such a manner as to leave a strip contiguous with one edge of the rung and having a width less than half that of the remainder of the rung. If desired, additional portions of reduced width may be provided at preselected locations along the length of each conductor.

The insulators which are employed in the bus bar assemblies of the present invention will also be formed as insulator intermediates having a ladder configuration. In forming the insulation intermediates, however, portions of reduced width are not provided nor will the rungs of the insulator intermediates have transversely extending tabs such as those which characterize the conductor intermediates.

Assembly of multilayer conductor assemblies in accordance with the present invention includes the stacking of alternate layers of insulator and conductor intermediates to define a multilayer structure which may thereafter be laminated. During the stacking operation one of the conductor intermediates will be inverted and reversed with respect to the other whereby the portions of reduced width will be offset from one another. Accordingly, after lamination, the plurality of multilayer bus bars may be severed from the side rails with a suitable cutting tool and, since there are no overlapping conductors at the points of cutting, the short circuiting problem of the prior art is obviated. If portions of reduced width have been provided in the conductors along their length, the bus bars may also be severed at such points into sections of shorter length as desired or necessary for a particular application.

During the production of the conductor intermediates the transversely extending tabs may be notched adjacent their junction with the main conductor so as to facilitate subsequent removal of unused tabs through the expedient of manual flexing and tearing.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 6:
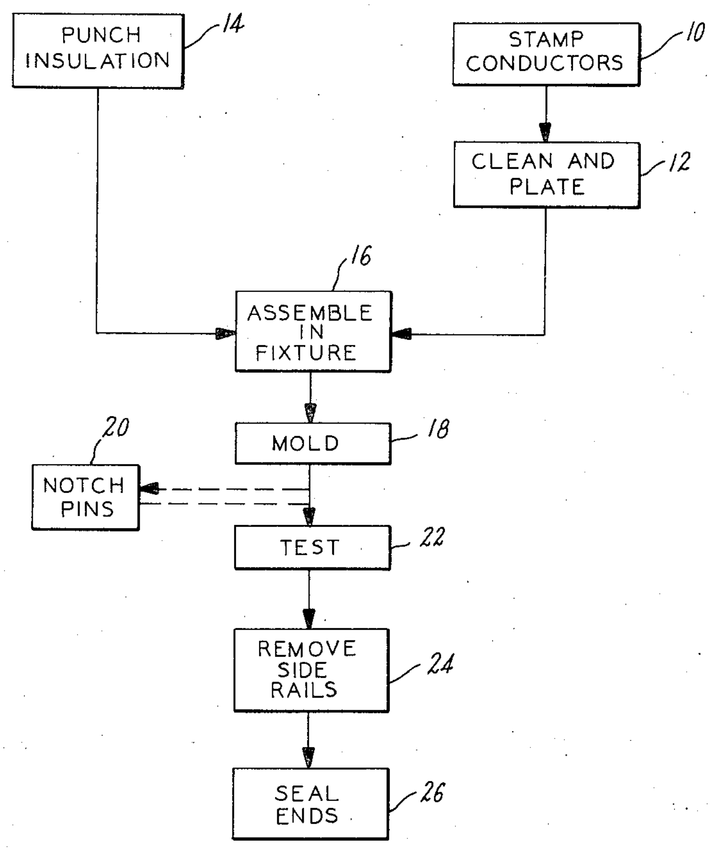
FIG. 6 is a flow diagram representing the manufacturing steps employed in the practice of the present invention.

As indicated at step 10 in FIG. 6, a first step in accordance with the present invention may be the formation of the conductor intermediates. A typical conductor intermediate, formed in accordance with the novel ladder configuration of the present invention, is shown generally at 30 in FIG. 1. The conductor intermediate will typically be formed from a sheet of 0.001 inch thick copper foil. The ladder configuration includes a plurality of rungs 32 which will form the bus bar conductors in the final multilayer conductor assembly. The ladder also includes side rails 34—34. The side rails 34, as well as the members 36 which complete a supporting frame around the conductors 32, are provided with a plurality of registration holes 38 as well as a slot 40 by which the conductor intermediate is supported with suitable fixtures during subsequent operations. Each of the conductor rungs 32 is provided with a notch or region of reduced width 42 adjacent its junction with the side rails 34. Additional portions of reduced width, such as portions 44, may be provided along the length of each conductor for the purposes to be described below. The width of the conductors in the regions of portions 42 and 44 will be less than one-half the width of the other portions of the conductor rungs. The major width of the conductor rungs will typically be 0.250 inches and the length between side rails may be any desired length with 7 to 10 inches being typical. The conductor rungs 32 are also provided with a plurality of transversely extending tabs or pins 46.

Figure 1:
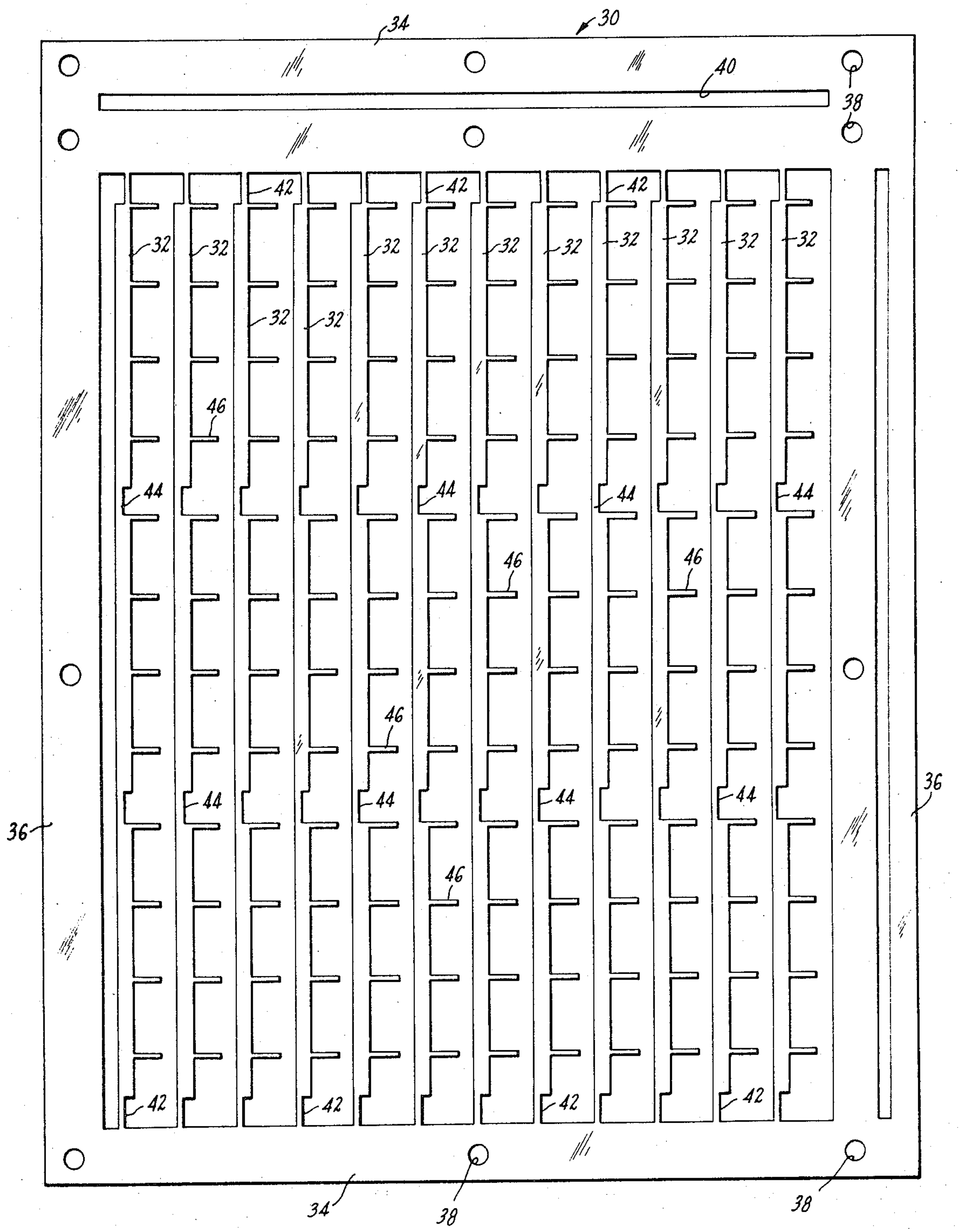
FIG. 1 is a top plan view of a conductor intermediate employed in the present invention.

Step 10 of FIG. 6 indicates that the conductor intermediates 30 of FIG. 1 are generated by being stamped from a sheet of copper foil. It is, however, to be noted that the conductor intermediates may also be formed by chemically etching in accordance with well-known photofabrication techniques. If stamped, the conductor intermediates may be die blanked in accordance with the technology described in Greenman et al U.S. Pat. No. 2,986,804. The stamping operation may be performed on either pre-plated stock or on bare stock.

Presuming that bare stock is employed in step 10, after the conductor intermediates 30 have been formed, either by die-stamping or chemically etching, the copper will be cleaned, chemically deburred and tin plated as indicated at step 12. These cleaning and plating operations are well known in the art and will not be described herein.

Figure 2:
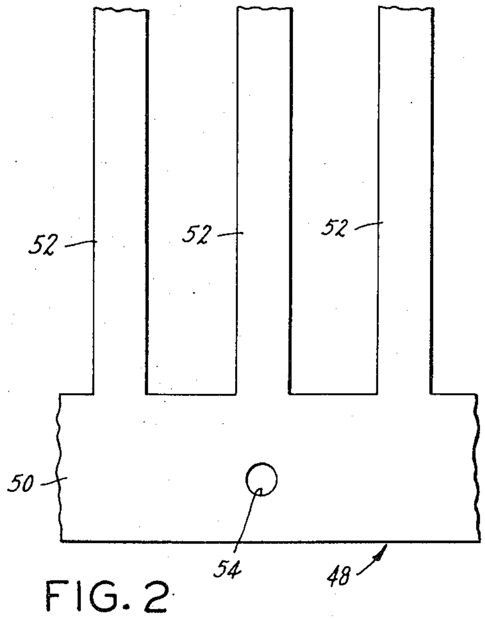
FIG. 2 is a partial top plan view of an insulator intermediate employed in the present invention.

In accordance with the present invention, the insulation intermediates are also formed in the ladder configuration. A portion of such an insulator intermediate is depicted generally at 48 in FIG. 2 and includes a side rail 50 and rungs 52. It will be noted that the rungs 52 of the insulator intermediates are of constant width; that is, insulator intermediates 48 do not have the portions of reduced width which characterize the conductor intermediates. The insulator intermediates similarly do not have the transversely extending portions which define the tabs or size 46 of the conductors. As indicated at step 14 in FIG. 6, the insulator intermediates are prepared by punching out the insulation in the desired configuration on a steel ruled die. It is necessary that three insulator intermediates or layers be prepared for each two-layer bus bar assembly; there being one inner insulator which separates the conductors and two outer insulators which serve as protection for the conductors. Referring again to FIG. 2, it will be noted that during the punching operation 14 the insulator intermediates will be provided with registration holes, such as hole 54, which correspond to the holes 38 in the conductor intermediates. In a typical assembly the center intermediate will be comprised of polyethylene terephthalate which has been coated on both sides with a suitable acrylic adhesive. A typical center insulator will be 0.002 inch thick "Duroid" 8121.2 available from Rogers Corporation, Rogers, Connecticut. The outer insulators will typically be a laminate such as "Duroid" 8124.2 available from Rogers Corporation, Rogers, Connecticut. Duroid 8124.2 comprises 0.003 inch thick "Mylar" laminated with 0.002 inch thick polyvinyl fluoride. The outer insulators will be coated, on their inwardly facing surfaces, with an acrylic adhesive such as type 6840 available from E.I. du Pont.

Figure 3:
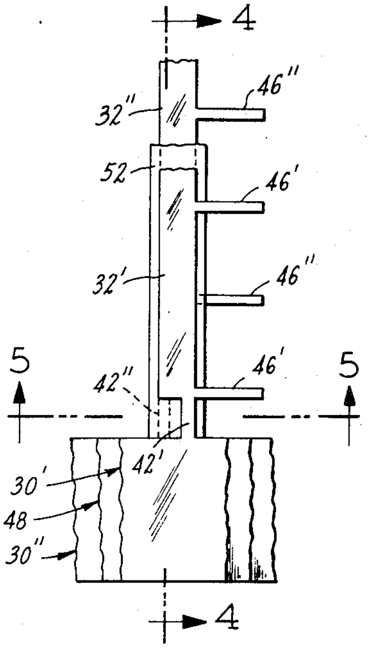
FIG. 3 is a partial top plan view, with the upper and lower protective layers of insulation removed, of the present invention after lamination and prior to separation.

After formation of the conductor and insulator intermediates has been completed, the intermediates will be assembled in a fixture, as indicated at step 16, employing the registration holes in the various intermediates to insure proper alignment. In the stacking operation one of the conductor intermediates 30 will be inverted and reversed so as to provide the structure partially indicated in FIG. 3. It is to be noted that in FIG. 3 the outer insulators have been omitted in the interest of clarity. Thus, FIG. 3 indicates a first conductor intermediate 30', a second conductor intermediate 30'' which is reversed with respect to the first conductor intermediate, and the center or separating insulator intermediate 48. From FIG. 3 it may be seen that the stacking operation results in a structure, at the junction between the conductor rungs 32 and ladder side rails, wherein the two layers of conductive material 42' and 42'' are laterally and vertically offset from one another and are separated by the center insulator 48.

Figure 4:
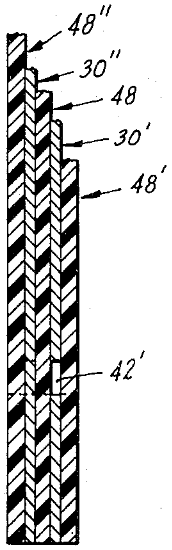
FIG. 4 is a side view, taken along line 4—4 of FIG. 3, depicting the present invention before separation into separate components and with the upper and lower insulators included.

After the multilayer structure has been assembled in the fixture, the product is laminated into a unitary structure in molding step 18. A typical molding cycle will comprise the application of a pressure of 100 psi for 2–3 minutes at a temperature of 340° to 350°F followed by a continued application of pressure for two minutes after removal of heat. The structure resulting from the lamination step is shown partially in cross section in FIG. 4. It is to be noted that the outer layers of insulation 48' and 48'' are shown in FIG. 4.

Figure 5:
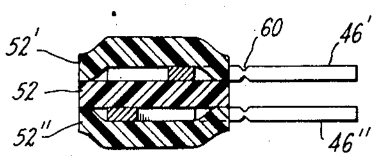
FIG. 5 is a cross-sectional view taken along line 5—5 of FIG. 3, depicting a portion of a multilayer bus bar produced in accordance with the present invention.

If required by the ultimate user of the bus bar assemblies produced in accordance with the present invention, provision may be made to facilitate removal of unnecessary tabs 46. That is, in order to enhance the flexibility of the product, a redundancy of tabs which can be removed leaving only the desired configuration may be provided. To this end, an additional stamping operation, indicated at 20, may be performed. The results of this stamping operation may be best seen from FIG. 5 which indicates stress risers 60 stamped at the root of each of the tabs. The presence of the stress risers allows the tabs to be easily fractured and thus removed. It will be noted that while step 20 has been shown as a separate operation performed subsequent to molding, the provision of stress risers in the tabs may be accomplished simultaneously with the stamping step 10 or subsequent thereto and prior to assembly step 16.

After the molding operation, and prior to separation into separate bus bar assemblies for delivery to a customer, the entire intermediate structure will be tested by application of 500 volts d.c. between the conductive layers. This testing step is indicated at 22 and will indicate the presence of any short circuits. Accordingly, it may be seen that the technique of the present invention provides the additional manufacturing efficiency of ability to electrically test a plurality of bus bar assemblies simultaneously.

After the electrical test, the side rail laminates are removed in step 24. The severing and removal of the side rails is achieved by cutting through the rungs in the regions of the offset portions 42 of reduced width with any suitable tool. Since there are no overlapping conductors in the cutting regions, there can be no short circuiting layer to layer by distortion of conductors caused by the cutting tool.

If deemed necessary by the customer, the individual conductor assemblies may be edge sealed, in step 26, by dipping the conductors exposed during the severing step 24 in insulating varnish. It will also be noted that, if testing step 22 has indicated a fault, the individual bus bar assemblies will be tested after removal of the side rails in step 24. This additional testing step may indicate that the fault was in the region of the side rails or in a single bus bar assembly whereupon the remainder of the conductor assemblies may be employed.

The end product, which will comprise a plurality of standard individual, multilayer bus bar assemblies, may now be delivered to a customer. Should the customer desire to employ a bus bar with a length less than the length of the conductor rungs 32, it need only sever the standard bus bars of the present invention in the regions of reduced width portions 44. These regions will, of course, be suitably marked to facilitate this optional step. Similarly, if the optional stamping step 20 has been performed, the ultimate customer may also remove selected pins 46 in the manner described above.

While a preferred embodiment has been shown and described, various modifications and substitutions may be made thereto without departing from the spirit and scope of the present invention. Accordingly, it is to be understood that the present invention has been described by way of illustration and not limitation.

What is claimed is:

1. An electrical conductor assembly comprising:

first conductor means, said first conductor means including a first flat elongated conductor having substantially parallel edges and at least a pair of cutouts defining segments of reduced width, the maximum width of said reduced width segments being less than one-half the width of said first flat conductor between said edges, each of said cut-outs extending inwardly from an edge of said first flat conductor, said first conduct means further comprising a plurality of tabs extending transversely of said first flat conductor;

second conductor means, said second conductor means comprising a second flat elongated conductor having substantially the same size and shape as said first flat conductor, said second flat conductor having at least a pair of cut-outs defining segments of reduced width positioned at points along the length of said second flat conductor corresponding to the location of the cut-outs in said first flat conductor, the maximum width of said reduced width segments of said second flat conductor being less than one-half of the width of said second flat conductor between its edges, said second flat conductor cut-outs each extending inwardly from the edge of said second flat conductor opposite to the edge of the first conductor from which the corresponding first conductor cut-out extends, said second conductor means further comprising a plurality of tabs extending transversely of said second flat conductor; and insulating means supporting said conductor means with said first and second flat conductors in spaced apart aligned relationship with said reduced width segments of said flat conductors oriented so as to define at least a pair of regions of vertically displaced and laterally offset conductor segments which will be intersected by planes transverse to said aligned conductors.

2. The article of claim 1 wherein said insulating means comprises:

a first elongated insulator separating said first and second conductors along their lengths; and second and third insulators of constant width bonded to the outwardly disposed sides of said conductors, said second and third insulators being wider than said conductors and being bonded together to encapsulate said conductor assembly.

3. The article of claim 2 wherein:

said transversly extending tabs are integral with said conductors and extend out of said encapsulated assembly.

4. The article of claim 3 further comprising:

strips of conductive material integral with and extending from the opposite ends of and transversely to said conductors, segments of reduced width of each conductor being located at the junctions of said conductors and strips whereby said conductors may be severed through said reduced width segments thereby freeing the conductor assemblies from said transversely extending strips.

5. The article of claim 4 wherein there is at least one region of vertically displaced and laterally offset conductor segments located intermediate the ends of the conductors.

6. The article of claim 3 wherein there is at least one region of vertically displaced and laterally offset conductor segments located intermediate the ends of the conductors.

7. The article of claim 1 further comprising:

strips of conductive material integral with and extending from the opposite ends of and transversely to said conductors, segments of reduced width of each conductor being located at the junctions of said conductors and strips whereby said conductors may be severed through said reduced width segments thereby freeing the conductor assemblies from said transversely extending strips.

8. An electrical conductor assembly comprising:

a first flat conductor subassembly, said first subassembly including a plurality of substantially parallel conductors having segments of reduced width at the ends thereof, said segments defining conductor regions of width less than one-half the width of said conductors intermediate said segments, said conductors being continuous along an edge in the vicinity of said segments, said first conductor subassembly further including a first pair of support members, said support members extending transversely of said conductors and being connected to and integral with the reduced width end segments of said conductors;

a second flat conductor subassembly, said second subassembly having substantially the same size and shape as said first conductor subassembly and including a plurality of substantially parallel conductors having segments of reduced width at the ends thereof, said segments defining conductor regions of width less than one-half the width of said conductors of said second subassembly intermediate said segments, said conductors of said second subassembly each being continuous along an edge opposite to the corresponding edge of the parallel conductors of said first subassembly in the vicinity of said segments, said second conductor subassembly further including a second pair of support members, the support members of said second pair extending transversely of said conductors of said second subassembly and being connected to and integral with the reduced width end segments of said conductors; and insulating means supporting said first and second conductor subassemblies in spaced apart relationship with said conductors and support members being parallel and said reduced width conductor end segments of said first and second subassemblies being vertically and laterally displaced from one another.

9. The electrical conductor assembly of claim 8 wherein said insulating means comprises:

first insulating means having a plurality of parallel members disposed between the conductors of said first and second subassemblies, said parallel insulating members being at least as wide as said conductors and being of constant width, said first insulating means further including a pair of insulators integral with said parallel members and extending transversely of the opposite ends thereof, said insulators of said pair each being disposed between first and second support members of said first and second subassemblies.

10. The electrical conductor assembly of claim 9 wherein said insulating means further includes:

second and third insulating means, said second and third insulating means comprising parallel insulators of constant width bonded to the outwardly disposed sides of the conductors of said first and second subassemblies, said insulators of the second and third insulating means being wider than said conductors and being bonded together to encapsulate said conductor assembly.

11. The electrical conductor assembly of claim 10 wherein each of said conductors of said first and second subassemblies further comprises:

a plurality of transversely extending tabs, said tabs being integral with said conductors and extending out of said encapsulated assembly.

12. The electrical conductor assembly of claim 10 wherein said conductors of said first and second subassemblies each further comprise:

at least one additional segment of reduced width intermediate the ends of the conductor, said intermediate segments of reduced width of said conductors being in at least partial registration.

13. The electrical conductor assembly of claim 12 wherein each of said conductors of said first and second subassemblies further comprises:

a plurality of transversely extending tabs, said tabs being integral with said conductors and extending out of said encapsulated assembly.

14. The electrical conductor assembly of claim 8 wherein said conductors of said first and second subassemblies each further comprise:

at least one additional segment of reduced width intermediate the ends of the conductor, said intermediate segments of reduced width of said conductors being in at least partial registration.

* * * * *